United States Patent
Mahapatra et al.

(10) Patent No.: US 9,792,100 B1
(45) Date of Patent: Oct. 17, 2017

(54) APPLICATION DEPLOYMENT SYSTEM AND METHOD FOR A COMPUTING INFRASTRUCTURE

(71) Applicant: VCE Company, LLC, Richardson, TX (US)

(72) Inventors: Akshaya Mahapatra, San Jose, CA (US); Michael Tan, Palo Alto, CA (US); Rahul Talekar, San Jose, CA (US)

(73) Assignee: VCE IP Holding Company LLC, Richardson, TX (US)

( * ) Notice: Subject to any disclaimer, the term of this patent is extended or adjusted under 35 U.S.C. 154(b) by 0 days.

(21) Appl. No.: 14/479,028

(22) Filed: Sep. 5, 2014

(51) Int. Cl.
*G06F 9/45* (2006.01)
*G06F 9/445* (2006.01)
*H04W 4/02* (2009.01)
*H04L 29/08* (2006.01)

(52) U.S. Cl.
CPC ............... *G06F 8/61* (2013.01); *H04L 67/10* (2013.01); *H04W 4/02* (2013.01)

(58) Field of Classification Search
USPC .................................................. 717/168–178
See application file for complete search history.

(56) References Cited

U.S. PATENT DOCUMENTS

| | | | |
|---|---|---|---|
| 6,643,843 B1 * | 11/2003 | Reger ........................... | 717/168 |
| 6,904,592 B1 * | 6/2005 | Johnson ..................... | G06F 8/65 |
| | | | 705/52 |
| 8,896,704 B2 * | 11/2014 | Huang ................... | H04N 17/04 |
| | | | 348/177 |
| 2003/0027563 A1 * | 2/2003 | Herle ........................ | G06F 8/65 |
| | | | 455/419 |
| 2004/0148379 A1 * | 7/2004 | Ogura ..................... | H04L 29/06 |
| | | | 709/223 |
| 2006/0026304 A1 * | 2/2006 | Price ........................ | G06F 8/65 |
| | | | 710/8 |
| 2008/0244566 A1 * | 10/2008 | Fukaya ........................ | 717/176 |
| 2011/0061046 A1 * | 3/2011 | Phillips ........................ | 717/176 |
| 2012/0102161 A1 * | 4/2012 | Deprun ........................ | 709/220 |
| 2012/0311564 A1 * | 12/2012 | Khalid ............................. | 718/1 |
| 2014/0068599 A1 * | 3/2014 | Kannan et al. ................... | 718/1 |
| 2014/0098671 A1 * | 4/2014 | Raleigh et al. ............... | 370/235 |

(Continued)

*Primary Examiner* — Matthew Brophy
(74) *Attorney, Agent, or Firm* — Polsinelli PC

(57) ABSTRACT

An application deployment system includes a computing device that stores computing infrastructure (CI) information associated with a computing infrastructure to be deployed in a portable memory structure, wherein the portable memory structure is physically associated with the computing infrastructure to be deployed. When the computing infrastructure is transported to the deployment site, the computing device receives the stored application configuration information from a portable communication device that has previously obtained the stored application configuration information from the portable memory structure, obtains one or more applications to be installed on the computing infrastructure according to the received application configuration information, and transmits the applications to the portable communication device, wherein the portable communication device downloads the applications to the computing infrastructure for being installed on the computing infrastructure.

20 Claims, 6 Drawing Sheets

(56) References Cited

U.S. PATENT DOCUMENTS

| | | | |
|---|---|---|---|
| 2014/0109094 A1* | 4/2014 | Datla et al. | 718/100 |
| 2014/0181801 A1* | 6/2014 | Voronkov et al. | 717/177 |
| 2014/0259000 A1* | 9/2014 | Desanti et al. | 717/171 |
| 2014/0280893 A1* | 9/2014 | Pfeifer et al. | 709/224 |
| 2014/0359578 A1* | 12/2014 | Jesse et al. | 717/124 |
| 2015/0007167 A1* | 1/2015 | Mody | G06F 8/61 717/176 |
| 2015/0095905 A1* | 4/2015 | Chakrabarti | G06F 9/445 717/178 |

\* cited by examiner

APPLICATION DEPLOYMENT SYSTEM AND METHOD FOR A COMPUTING INFRASTRUCTURE

TECHNICAL FIELD

Aspects of the present disclosure relate to computing devices and, in particular, to an application deployment system and method for a computing infrastructure.

BACKGROUND

Computing resources used by enterprises, such as corporations and universities, are often provided by computing infrastructures that utilize multiple computing devices that function in a collaborative manner to meet the computing resource needs of the enterprise. The computing devices for such computing infrastructures are configured in various process load sharing and/or redundant configurations to provide a level of availability and reliability required by these enterprises. Additionally, each computing device is typically installed with one or more executable applications that collaborate with other applications to accomplish the overall functionality provided by these computing infrastructures.

SUMMARY

According to one aspect of the present disclosure, an application deployment system includes a computing device that stores application configuration information associated with a computing infrastructure to be deployed in a portable memory structure, wherein the portable memory structure is physically associated with the computing infrastructure to be deployed. When the computing infrastructure is transported to the deployment site, the computing device receives the stored application configuration information from a portable communication device that has obtained the stored application configuration information from the portable memory structure, obtains one or more applications to be installed on the computing infrastructure according to the received application configuration information, and transmits the applications to the portable communication device, wherein the portable communication device downloads the applications to the computing infrastructure for being installed on the computing infrastructure.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope

DETAILED DESCRIPTION

Aspects of an application deployment system for a computing infrastructure (CI) described herein provides a mechanism for deploying applications on a computing infrastructure in a consistent manner using a central repository where applications to be deployed on the computing infrastructures are stored and maintained. The application configuration information includes the executable applications, configuration parameters associated with the applications, and other application configuration information associated with operations of the computing infrastructures. Because many computing infrastructures are often deployed in locations where Internet access is not available, the application deployment system utilizes the information conveying ability of other communication networks, such as a cellular communication network or a WiFi communication network, to transfer the applications to the site where the computing infrastructures are to be deployed. Transfer of the applications is facilitated by a portable communication device (e.g., smart phone or a tablet computer) that reads application configuration information from a portable memory structure, which is physically associated with the remote computing infrastructure, and transmits one or more requests for the appropriate applications from the repository.

Figure 1:
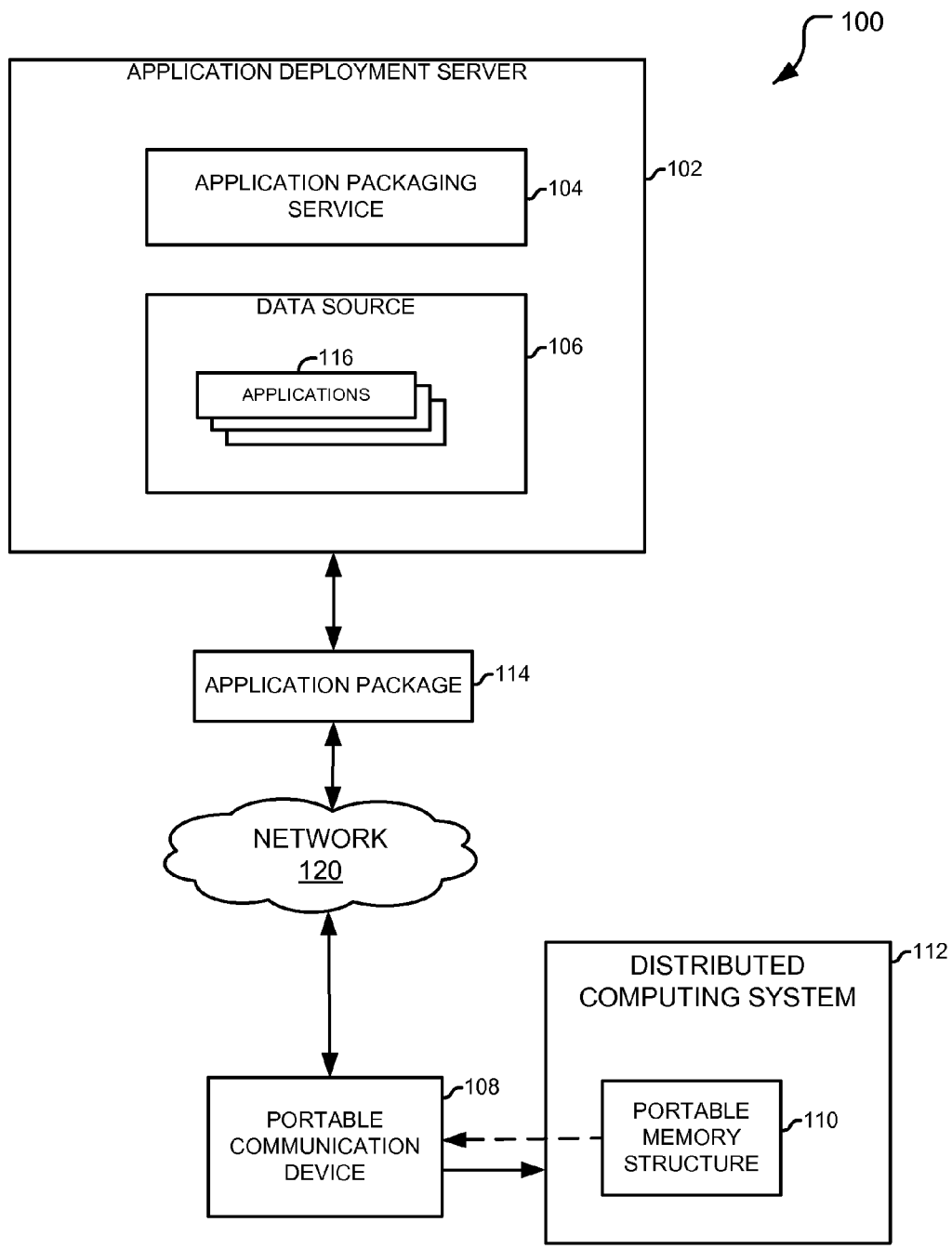
FIG. 1 illustrates an example application deployment system according to one embodiment of the present disclosure.

FIG. 1 illustrates an example application deployment system 100 according to the teachings of the present disclosure. The system 100 includes an application deployment server 102 that includes an application packaging service 104 and a data source 106. When executed, the application packaging service 104 communicates with a portable communication device 108 to receive application configuration information obtained by the portable communication device 108 from a portable memory structure 110 physically associated with a computing infrastructure 112. Using the application configuration information, the service 104 generates an application package 114 including one or more applications 116 that is subsequently transmitted to the computing infrastructure 112, using the portable communication device 108 so that the applications 116 may be installed on the computing infrastructure 112.

Manufacturers of computing infrastructures 110 often create customized packages that are ideally suited for operation by each of their customers. Although the high level of customization of computing infrastructures has provided for unique adaptation for each customer's needs, several problems may arise when computing infrastructures have different configuration requirements and/or features. Conventional computing infrastructure deployment typically requires the use of memory devices (e.g., compact disks (CDs), digital video disks (DVDs), universal serial bus (USB) based memory devices, external hard drives) that are transported along with the computing infrastructure 112 to its destination. Such memory devices store application and configuration parameters for the computing infrastructure. In many cases, however, the applications stored on these memory devices are outdated when the computing infrastructure is deployed. In some cases the current of the applications may be downloaded, but in many cases network connectivity is not available at the computing infrastructure.

Embodiments of the present disclosure provide a solution to this problem, among other problems, by incorporating a portable memory structure 110 that is associated with each computing infrastructure 112. The portable communication device 108 may read application configuration information from the portable memory structure 110 and transmit the application configuration information to the application packaging service 104. The service, upon receipt, generates an application package that includes data for deploying the computing infrastructure, such as appropriate versions for applications to be installed on the subject computing infrastructure 112, configuration parameters for configuring each application, and other CI related configuration information and returns the package to the portable communication device. The portable communication device 108 may communicate via a cellular communication network 120, WiFi network, or other similar wireless network, which are often available proximate the computing infrastructure.

The portable memory structure 110 may be any type that stores application configuration information for the computing infrastructure 112 and that may be read by a portable communication device 108. In one embodiment, the portable memory structure 110 includes a quick response (QR) code having a two-dimensional array of indicia that may be read by a camera configured on the portable communication device 108. In another embodiment, the portable memory structure 110 may include a memory device, such as a USB stick, that is physically associated with its respective computing infrastructure 112. Within this disclosure, the term "physically associated with" is generally defined to mean attached to, releasably mounted on, or otherwise configured on its respective computing infrastructure in a manner that ensures the portable memory structure remains physically secured on its respective computing infrastructure at least until its contents may be read during deployment at a remote site from where the computing infrastructure is fabricated. Additionally, the portable memory structure 110 could be printed on a label and then affixed to the computing infrastructure or other packaging item, such as a box in which the computing infrastructure is shipped.

In general, the application packaging service 104 receives application configuration information from the portable communication device 108, obtains applications 116 from the data source 106 that is compatible with the received application configuration information, and configuration parameters associated with the applications, and generates an application package that is subsequently transmitted to the portable communication device 108 for being installed on the computing infrastructure 112. In one embodiment, the application packaging service 104 includes a PUPPET MASTER™ computing infrastructure configuration management tool available from PUPPET LABS™, which is headquartered in Portland, Oreg.

The data source 106 effectively functions as a repository for applications to be downloaded on, and executed by the computing infrastructure 112. In one embodiment, the data source 106 comprises a database that provides for efficient storage and access of the applications. In another embodiment, the data source 106 includes a document management system that tracks and maintains multiple versions for one, some, or all applications 116 executed by the computing infrastructure 112. For example, a particular application package may specify implementation of an application for use on the computing infrastructure 112 that is only verified for proper operation with a specific version of another application that may, or may not be the latest version of that other application. The document management system stores and makes available multiple versions of at least one or more of the applications, such that the application packaging service 104 may access an appropriate version of such applications such that compatibility of the applications among one another is maintained when deployed in the computing infrastructure.

The application package 114 includes data for deploying a customized configuration of the computing infrastructure 112. For example, the application package 114 includes applications (e.g., APACHE TOMCAT™ web server application binaries), configuration parameters associated with the these applications are to be configured in the computing infrastructure 112, and customized application configuration information associated with the overall configuration of the computing infrastructure 112. This data may be formatted in any suitable structure. In one embodiment, the applications, configuration parameters, and application configuration information may be formatted in a Javascript object notation (JSON) format. An example, portion of an application package 114 including configuration parameters is shown herein below:

```
{
  "Vblock": {
    "VblockComponents": [
      {
        "ucsmanager": "172.23.55.80",
        "userid": "admin",
        "password": "****"
      },
      {
        "storagecontroller": "172.23.55.81",
        "userid": "nasadmin",
        "password": "****"
      },
      {
        "managementswitch": "172.23.55.86",
        "userid": "admin",
        "password": "****"
      }
    ]
  },
  "VblockVLANs": [
    {
      "mgmtvlan": "2250"
    },
    {
      "vmotionvlan": "2251"
    }
  ]
}
```

In the above example, the configuration parameters include multiple user accounts to be assigned to a specific computing infrastructure in which each user account is specified with a particular IP address, a user name, and a password for the account. For example, the user account 'ucsmanager' is assigned with a IP address '172.23.55.80', a user name (userid) of 'admin', with a password of '****'.

Another example portion of an application package 114 including application configuration information (e.g., where the APACHE TOMCAT™ web server is to be stored in the computing infrastructure) is shown herein below:

```
{
  "webapplication": {
    "components": [
      {
        "name": "tomcat",
        "folder": "/opt/tomcat",
        "port": "8080"
      },
      {
        "name": "mysql",
        "folder": "/opt/mysql",
        "port": "1434"
      }
    ]
  }
}
```

In the above example, the application configuration information specifies several applications to be downloaded and installed on the specific computing infrastructure. For example, the TOMCAT™ application is specified to be downloaded from port '8080' of the application deployment server 102 and stored in folder 'opt/tomcat' folder of the computing infrastructure, while the MYSQL™ application is specified to be downloaded from port '1434' of the application deployment server 102 and stored in folder '/opt/mysql' folder of the computing infrastructure.

The server 102 and the portable communication device 108 communicate with one another in any suitable manner. For example, the server 102 and the portable communication device 108 communicate with each other using wireless and/or wireline communications, such as the Internet, an intranet, or another wired and/or wireless communication network. In one embodiment, the server 102 and the portable communication device 108 communicate with one another using a cellular communication network at least on the initial network connection for the portable communication device and recognizes that portions of the communication between the device 108 and the server 102 may traverse various network forms, whether wired or wireless. In one aspect, the server 102 and portable communication device 108 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist.

Figure 2A:
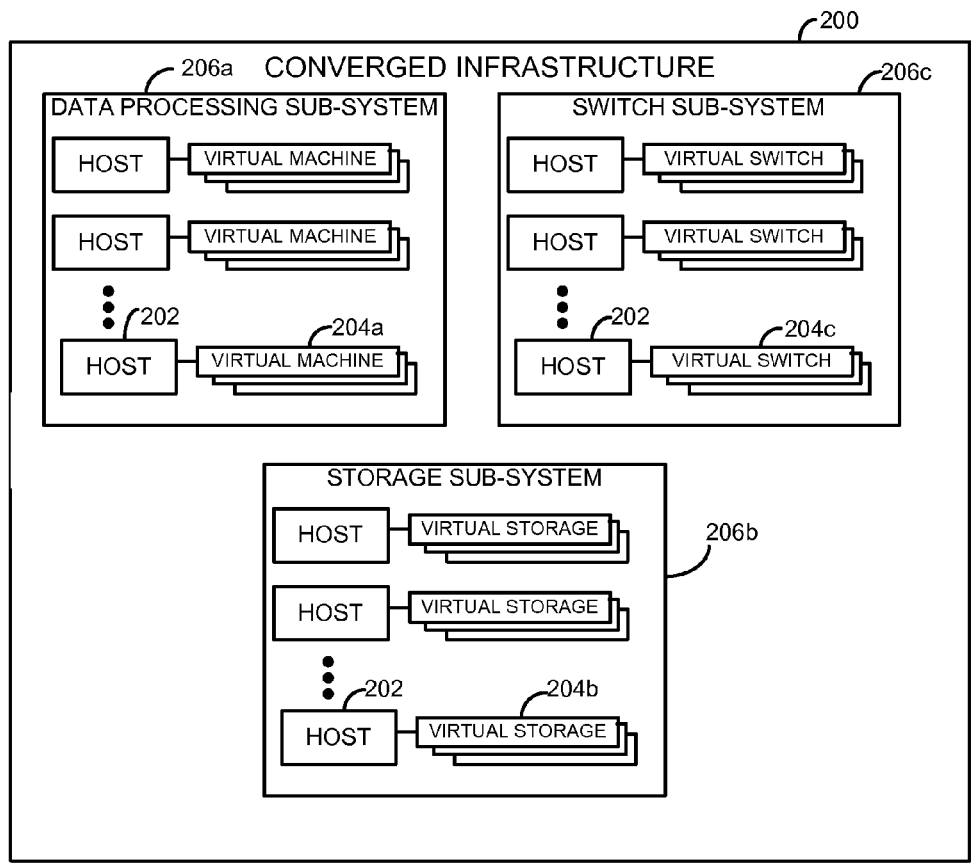
FIG. 2A illustrates an example converged infrastructure that may be implemented as a computing infrastructure according to one embodiment of the present disclosure.

FIG. 2A illustrates an example converged infrastructure 200 that may be implemented as one specific example of a computing infrastructure 112 according to the teachings of the present disclosure. The converged infrastructure 200 may be any type having multiple hosts 202 that each executes one or more virtual objects (e.g., virtual machines 204a, virtual storage objects 204b, and virtual switch objects 204c). In a particular example, the converged infrastructure 200 such as that shown in FIG. 2 includes components found in Vblock™ System infrastructure packages available from VCE, LLC, which is located in Richardson, Tex. Converged infrastructures are often implemented in environments where relatively high reliability and/or availability are desired, such as in an enterprise environment. Nevertheless, it is contemplated that any computing infrastructure, such as a computer cluster, computing grid, blade array, and/or other computing infrastructure may be configured using the teachings of the present disclosure.

Converged infrastructures may involve multiple computing components pre-integrated into an optimized computing solution. The computing components of a converged infrastructure solution may include servers, data storage components, networking equipment and software for managing the integrated components. To assist in the scalability, management and sharing of resources, particularly in large data center environments, converged infrastructures may involve a pool of server, storage and networking capacities, typically virtualized, that can shared by multiple applications.

The hosts of a converged infrastructure are often referred to as compute servers. Nevertheless, a 'host' may be any physical device and/or component that supports the operation of virtual resources and services provided by those virtual resources. The particular converged infrastructure 200 as shown includes several sub-systems, such as a data processing sub-system 206a, a data storage sub-system 206b, and a switch sub-system 206c. Nevertheless, it should be understood that other converged infrastructures 104 may include additional, fewer, or different types of sub-systems without departing from the spirit and scope of the present disclosure.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that access, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) 202 that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMWARE ESX™ software suite that is available from VMware Corporation, which is located in Palo Alto, Calif.

Figure 2B:
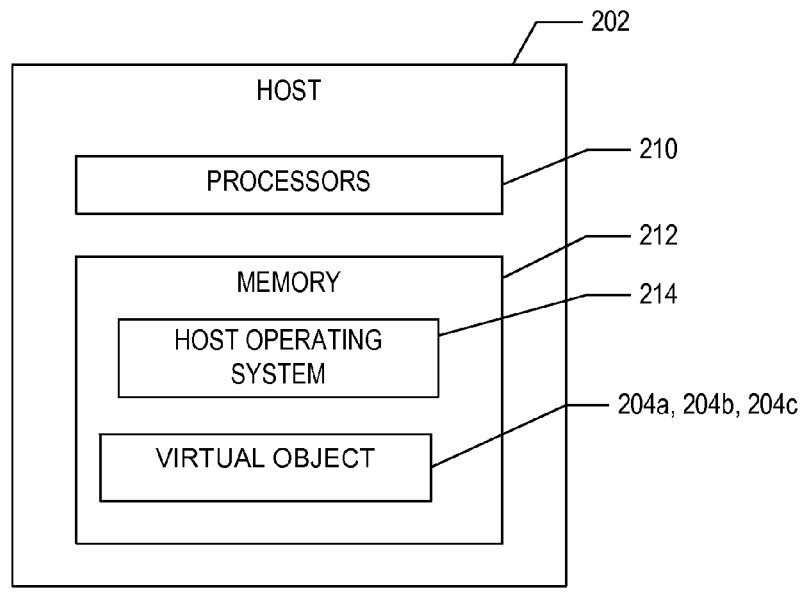
FIG. 2B illustrates an example host implemented on the converged infrastructure of FIG. 2A according to one embodiment of the present disclosure.

FIG. 2B illustrates an example host 202 implemented on the converged infrastructure 200 according to one aspect of the application alerting system 100. In general, the host 202 is a computing or processing device that includes one or more processors 210 and a memory 212. For example, the host 202 can be a personal computer, such as a laptop or notebook computer, a workstation, or other processing device such as a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more virtual objects (e.g., VMs 204*a*, virtual storage objects 204*b*, and virtual switch objects 204*c*) that are executed by the processor 210. The host operating system 214 controls and manages the operation of the virtual objects executed on the host 202. For example, control signaling for starting, stopping, and/or changing operating parameters of each virtual object is managed through the host operating system 214.

Figure 3:
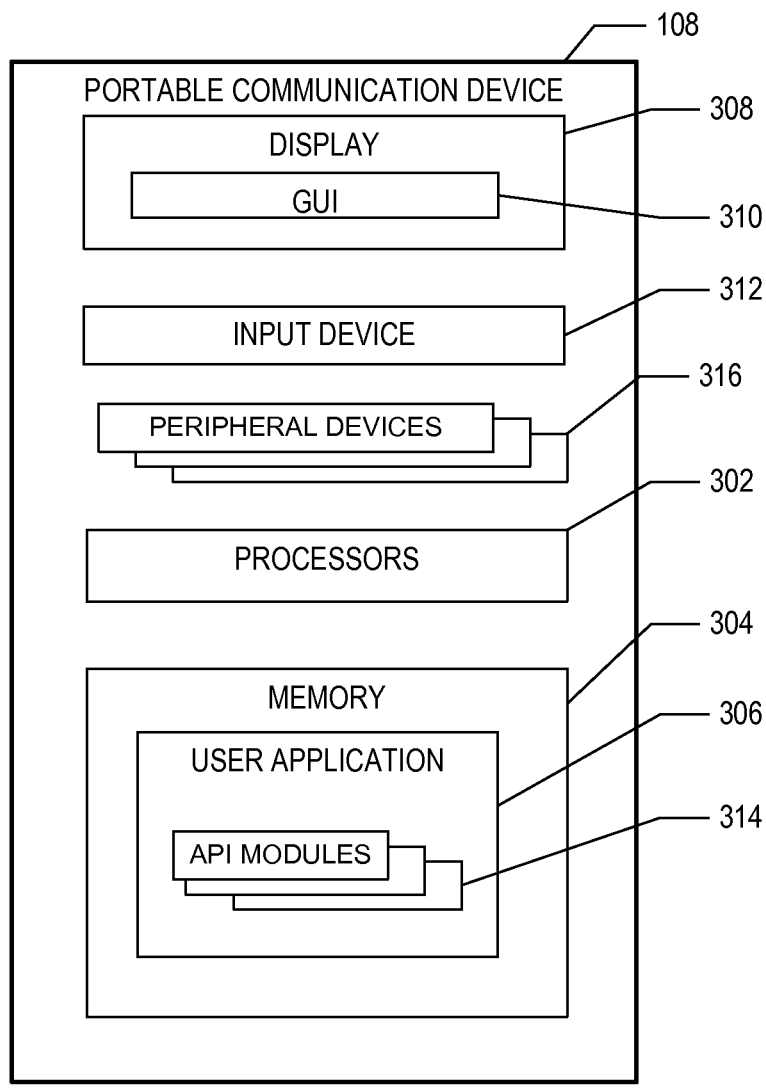
FIG. 3 depicts an example portable communication device according to one embodiment of the present disclosure.

FIG. 3 depicts an example portable communication device 108 according to one embodiment of the present disclosure. The portable communication device 108 is a computing or processing device that includes one or more processors 302 and memory 304. For example, the portable communication device 108 can be a personal computer, such as a laptop or notebook computer, a workstation, or other processing device such as a smart phone, or a tablet computer. In specific embodiments, the portable communication device 108 is a wireless communication device in the form of a smart phone or a tablet computer that stores and executes a user application 306 (e.g., a mobile app) for accessing the portable memory structure 110 and communicating with the application packaging service 104.

The portable communication device 108 includes a display 308, such as a computer monitor, for displaying data and/or a graphical user interface 310. The portable communication device 108 also includes an input device 312, such as a keyboard or a pointing device (e.g., a mouse, trackball, pen, or touch screen) to enter data into or interact with the graphical user interface 310. In one embodiment, the display 308 comprises a touch-screen device in which input is provided via contact by the user with the touch-screen device. The portable communication device 108 receives data and/or communications from, and/or transmits data and/or communications to, the server 102 via the communication network 120. In one embodiment, the user application 306 generates the graphical user interface (GUI) 310 to the display 308 for enabling a user to interact with the operation of the user application 306. The user application 306 is stored in the memory 304 and executed on the processors 302 to access the application configuration information included in the portable storage device 108, and communication with the application packaging service 104.

According to an aspect of the present disclosure, the user application 306 also includes one or more application program interface (API) modules 314 for communicating with one or more peripheral devices 316 configured in the portable communication device 108. In one embodiment, the user application 306 communicates with a peripheral device 316 for reading the data from the portable storage structure 110. For example, if the portable memory structure 110 is a QR code, the user application 306 may communicate with a peripheral device 316, such as camera to read the QR code. As another example, if the portable memory structure 110 is a USB memory device (e.g., a USB stick), the user application 306 may communicate with a peripheral device 316, such as USB port to read the USB memory device, or a camera to read the QR code. Additionally, the user application 306 may communicate with port (e.g. a USB port) configured on the portable communication device 108 to download the application package to the computing infrastructure 112 using a cable (e.g., a USB cable).

Figure 4:
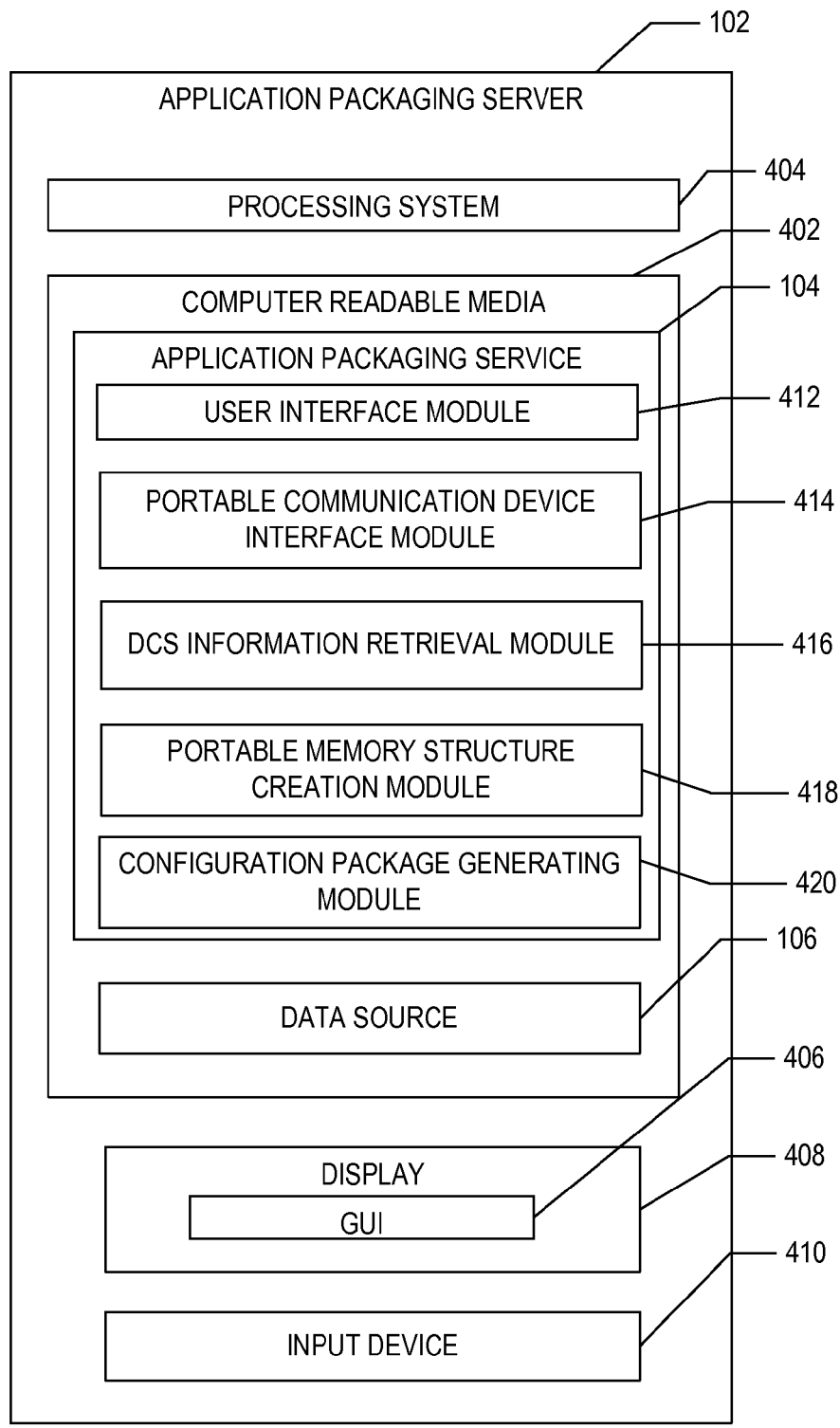
FIG. 4 illustrates an example application deployment server according to one embodiment of the present disclosure.

Referring now in more detail to FIG. 4, a block diagram of an example application packaging service 104 executed on the application deployment server 102, is depicted according to one embodiment of the present disclosure. Examples of the application deployment server 102 include one or more personal computers, mobile computers and/or other mobile devices, and other computing devices. The application packaging service 104 is stored in a memory 302 (i.e., computer readable media) and is executed on a processing system 404 of the application deployment server 102. According to one aspect, the operations application deployment server 102 also includes a graphical user interface (GUI) 406 displayed on the display 408, such as a computer monitor, for displaying data associated with deployment of the computing infrastructure 112. The application deployment server 102 also includes an input device 410, such as a keyboard or a pointing device (e.g., a mouse, trackball, pen, or touch screen) to enter data into or interact with the GUI 406. According to one aspect, the application packaging service 104 includes instructions or modules that are executable by the processing system 404 as will be described in detail herein below.

The computer readable medium 402 includes volatile media, nonvolatile media, removable media, non-removable media, and/or another available medium. By way of example and not limitation, non-transitory computer readable medium 402 comprises computer storage media, such as non-transient storage memory, volatile media, nonvolatile media, removable media, and/or non-removable media implemented in a method or technology for storage of information, such as computer readable instructions, data structures, program modules, or other data.

A user interface module 412 facilitates the receipt of input data and/or output data from or to a user, respectively. In one example, the user interface module 412 displays a representation of the computing infrastructure to be deployed along with a list of applications to be downloaded to a particular computing infrastructure, and any configuration parameters and other customized application configuration information. In another example, the user interface 412 may also receive user input for manipulating or otherwise modifying the application package 114. The user interface module 412 may also display one or more selectable fields, editing screens, and the like for receiving the user configuration information from the user.

A portable communication device interface module 414 provides an interface for communicating with the portable communication device 108. In one embodiment, the portable communication device interface module 414 may expose an interface, such as a uniform resource locator (URL) or an application program interface (API), that may be accessed by the user application 306 executed on the portable communication device 108. For example, the user application 306 may be hardcoded with the URL such that, when the user application 306 is executed, it accesses the portable communication device interface module 414 using the URL to transmit the application configuration information to the portable communication device interface module 414. Although one example of an interfacing technique is described herein for interfacing with the user application of the portable communication device 108, it should be understood that other techniques for communicating with the user application 306 may be implemented without departing from the spirit or scope of the present disclosure.

An application configuration information retrieval module 416 retrieves information for computing infrastructures 112 that are to be deployed. In one embodiment, the application configuration information retrieval module 416 retrieves configuration information from a logical customer specification (LCS) provided by the customer. The LCS generally refers to a core set of specifications indicating how a computing infrastructure is to be configured. For example, the LCS may specify which applications are to be deployed on a particular computing infrastructure, and may also specify any particular configuration parameters to be applied to each application. For example, the LCS may specify the size and redundancy level to be configured for one or more storage sub-systems of the computing infrastructure. In one embodiment, the application configuration information retrieval module 416 may include a VISION INTELLIGENT OPERATIONS™ software management application available from VCE Company, LLC, which is headquartered in Richardson, Tex.

A portable memory structure creation module 418 facilitates the creation of a portable memory structure 110 to be physically associated with the computing infrastructure 112. In one embodiment, the portable memory structure creation module 418 facilitates the creation of a QR code by communicating with a printer that prints the QR code on a piece of paper that is subsequently attached to a surface of the computing infrastructure 112 using a pressure sensitive adhesive or other attachment mechanism. The information encoded on the QR code may include, for example, which applications are to be downloaded, and any particular configuration parameters to be associated with each application, such as a particular version of an application, default configuration parameters to be associated with an application, what folder (e.g., sub-directory) that the application is to be stored in, and/or what port is to be used to access the application. In another embodiment, the portable memory structure creation module 418 writes the configuration information to a portable storage device, such as a USB stick that is then inserted into a pouch or pocket attached to the computing infrastructure 112.

A configuration package generating module 420 generates an application package 114 according to the received configuration information from the portable communication device 108. For example, the configuration package generating module 420 accesses application binaries specified for the computing infrastructure 112, which is specified in the received application configuration information. The application binaries may be immediately transmitted to the computing infrastructure 112, and/or they may be temporarily stored and sent together as one or more blocks of data. The configuration package generating module 420 may also specify a particular order in which the applications are to be installed on the computing infrastructure 112. For example, the configuration package generating module 420 may include code that, when executed, determines any dependencies of certain applications upon any other applications, and generates an installation schedule to ensure that the applications to which the subject application depends are installed first so that the dependencies may be satisfied.

It should be appreciated that the modules described herein are provided only as examples, and that the client may have different modules, additional modules, or fewer modules than those described herein. For example, one or more modules as described above with reference to FIG. 2 may be combined into a single module. As another example, certain modules described herein may be encoded on, and executed on other computing systems, such as on the server 102, or one of the other computing devices 108 of the computing infrastructure 112.

Figure 5:
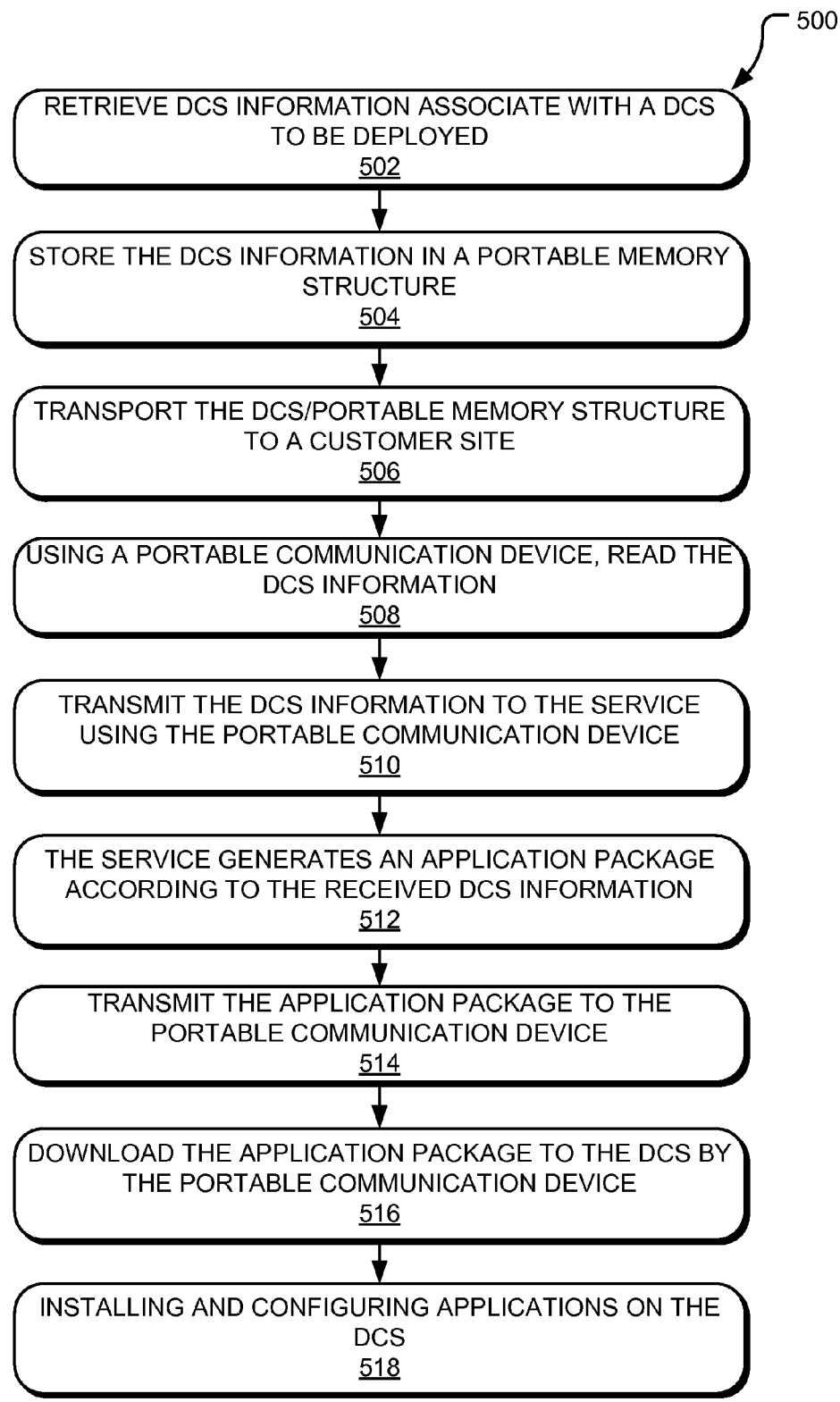
FIG. 5 illustrates an example process that is performed by the system to deploy a computing infrastructure (CI) according to the teachings of the present disclosure.

FIG. 5 illustrates an example process that is performed by the system 100 to deploy a computing infrastructure according to the teachings of the present disclosure. In step 502, the service 104 retrieves application configuration information associated with a computing infrastructure to be deployed (e.g., a converged infrastructure). In one embodiment, the service 104 may include a commercial-off-the-shelf (COTS) software management application, such as the VISION INTELLIGENT OPERATIONS™ software management application that generates a structured list of application configuration information from a LCS.

In step 504, the service 104 encodes and/or stores the application configuration information in a portable memory structure 110. For example, the service 104 may generate a QR code that includes the application configuration information that is subsequently attached to a component (e.g., a housing) of the computing infrastructure 112 or a package (e.g., box or rack) in which the computing infrastructure is delivered. The application configuration information may be stored in any suitable format. In one embodiment, the application configuration information is stored in an extensible markup language (XML) format.

In step 506, the computing infrastructure 112 and its associated portable memory structure is transported to the customer site. When the computing infrastructure 112 arrives at the customer site, a technician may use the portable communication device 108 to read the application configuration information from the portable memory structure 110 in step 508. For example, a mobile app executed on the portable communication device 108 may access a camera configured on the portable communication device 108 to read the data from the QR code attached to the side of the computing infrastructure 112.

In step 510, the portable communication device 108 transmits the application configuration information to the application packaging service 104. In one embodiment, the portable communication device 108 transmits the application configuration information to the application packaging service 104 by establishing a connection with a cellular communication network.

In step 512, the application packaging service 104 obtains applications specified in the application configuration information from the data source and generates an application package from the obtained application and any configuration parameters and/or customized application configuration information. In one embodiment, the service 104 determines a particular version of an application to be included in the application package from configuration information and/or customized application configuration information included in the received application configuration information. For example, the service 104 may determine that one particular application has been approved for use with a specific version of another application. Therefore, the service 104 may include that particular version of the application in the application package so that cross-compatibility of the two applications may be maintained.

In step 514, the application packaging service 104 transmits the application package to the portable communication device 108. Thereafter, the portable communication device 108 downloads the application package 114 to the computing infrastructure 112 in step 516. The portable communication device 108 may download the application package 114 to the computing infrastructure 112 using any suitable communication medium. Examples of suitable communication mediums include a WiFi connection, a near field communication (NFC) connection, and a universal serial bus (USB) connection.

Using the downloaded application package, the computing infrastructure 112 then installs the applications, and configures the applications using the downloaded configuration parameters. Additionally, the computing infrastructure 112 may configure any global CI parameters using the downloaded customized application configuration information.

The steps described above may be repeated for deployment of other computing infrastructures. Nevertheless, when deployment of other computing infrastructures are no longer needed or desired, the process ends.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., a hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 6:
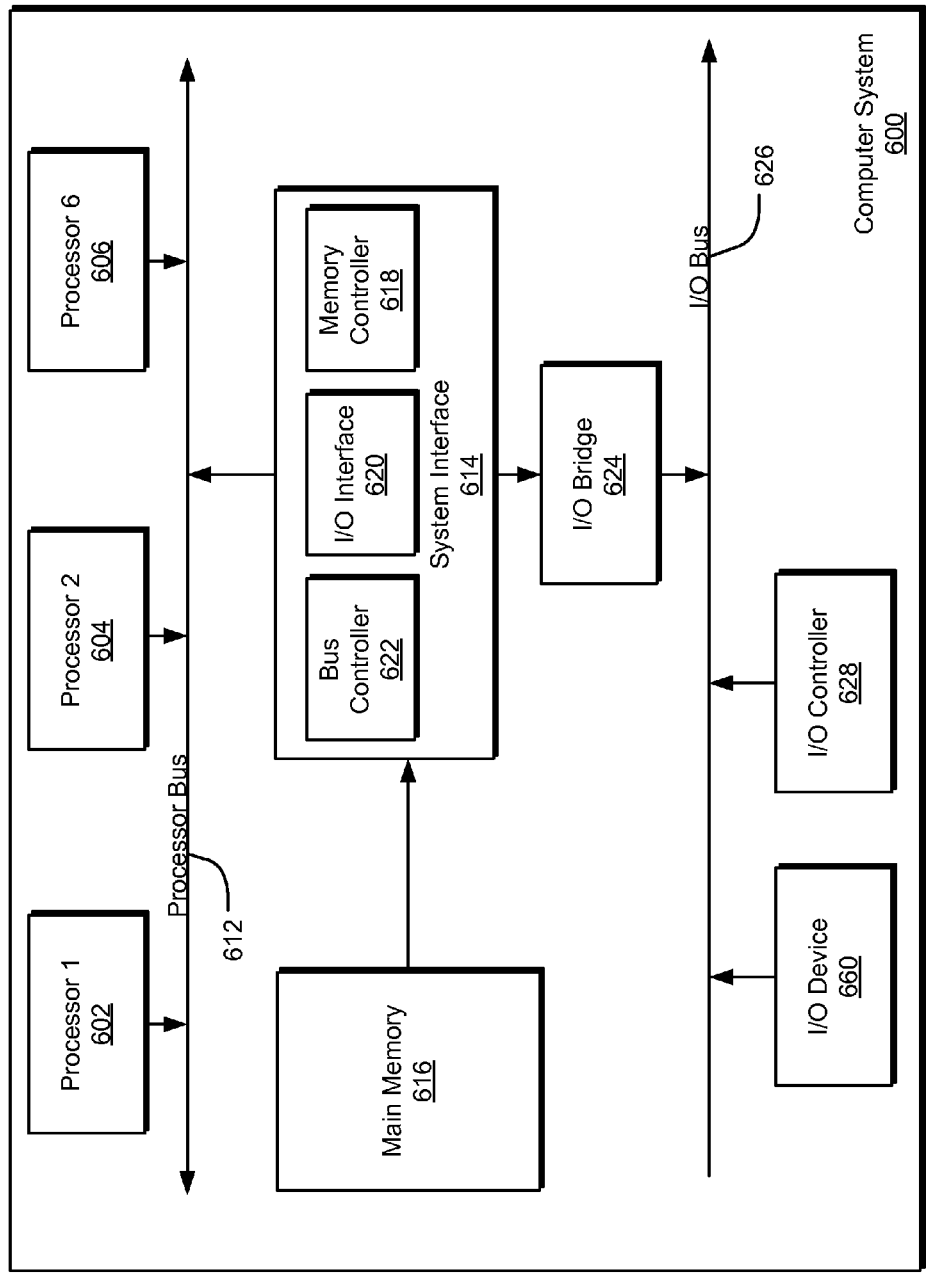
FIG. 6 is a block diagram illustrating an example of a computing device or computer system which may be used in implementing the embodiments of the present disclosure.

For example, FIG. 6 is a block diagram illustrating an example of a computing device or computer system 600 which may be used in implementing the embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 613 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An application deployment system comprising: a computing device comprising at least one processor and at least one memory to store a service that is executed by the at least one processor to:
   store customized application configuration information in a portable memory structure, wherein the portable memory structure is physically coupled to a converged infrastructure prior to deployment, the converged infrastructure comprising a plurality of independently functioning computing devices, the customized application configuration information comprising an indication of at least two different applications to be deployed in the converged infrastructure;
   when the converged infrastructure is at a deployment site, receive the stored customized application configuration information from a portable communication device that has obtained the stored customized application configuration information from the portable memory structure, the portable communication device separate and distinct from the converged infrastructure;
   establish a communication link between the converged infrastructure and a server having the at least two different applications to be installed in the converged infrastructure according to the received customized application configuration information, the communication link including the portable communication device; and
   obtain, for each computing device in the plurality of independently functioning computing devices in the converged infrastructure, at least one application from the at least two different applications as indicated in the application configuration information for the at least two of the independently functioning computing devices from the server using the communication link including the portable communication device to the converged infrastructure for customizing the at least two independently functioning computing devices by installing the applications on the at least two independently functioning computing devices.

2. The application deployment system of claim 1, wherein the service is further executed to generate the customized application configuration information from a set of specifications associated with the converged infrastructure to be deployed.

3. The application deployment system of claim 1, wherein the portable memory structure comprises at least one of a quick response (QR) code or a universal serial bus (USB) memory device.

4. The application deployment system of claim 1, wherein the customized application configuration information comprises one or more configuration parameters associated with how the applications are configured in the converged infrastructure and customized application configuration information associated with how the converged infrastructure is configured, and wherein the service is further executed to generate an application package using the configuration parameters, the customized application configuration information, and the applications, and obtain the applications to the converged infrastructure for installation on the converged infrastructure using the portable communication device.

5. The application deployment system of claim 1, wherein the service is further executed to transmit the applications to the portable communication device through a cellular communications network, the portable communication device downloading the applications to the converged infrastructure using at least one of a WiFi connection, a near field communication (NFC) connection, and a universal serial bus (USB) link.

6. The application deployment system of claim 1, wherein the service is further executed to obtain the applications from a database.

7. The application deployment system of claim 6, wherein the database comprises a version control system for storage and access to multiple versions of at least one of the applications.

8. The application deployment system of claim 1, wherein the customized application configuration information is stored on the portable memory structure in an extensible markup language (XML) format.

9. An application deployment method comprising: storing, using instructions stored on a non-transitory medium and executed on at least one processor, customized application configuration information in a portable memory structure, wherein the portable memory structure is physically coupled to a converged infrastructure prior to deployment, the converged infrastructure comprising a plurality of independently functioning computing devices, the customized application configuration information comprising an indication of at least two different application to be deployed in the converged infrastructure on each of the computing devices; when the converged infrastructure is at a deployment site, receiving, using the instructions, the stored customized application configuration information from a portable communication device that has obtained the stored customized application configuration information from the portable memory structure, the portable communication device separate and distinct from the converged infrastructure; establishing, using the instructions, a communication link between the converged infrastructure and a server having the at least two different applications to be installed in the converged infrastructure according to the received customized application configuration information, the communication link including the portable communication device; and obtaining, using the instructions, for each of the independently functioning computing devices the converged infrastructure, the at least two different applications as indicated in the application configuration information for that at least two of the independently functioning computing devices from the server using the communication link including the portable communication device to the computing device infrastructure for customizing the at least two independently functioning computing devices by installing the applications on the at least two independently functioning computing devices.

10. The application deployment method of claim 9, further comprising generating the customized application configuration information from a set of specifications associated with the converged infrastructure to be deployed.

11. The application deployment method of claim 9, further comprising: generating an application package using one or more configuration parameters, customized application configuration information, and the applications, the one or more configuration parameters being associated with how the applications are configured in the converged infrastructure and the customized application configuration information associated with how the converged infrastructure is configured; and obtaining, using the portable communication device, the application package to the converged infrastructure for being installed on the converged infrastructure.

12. The application deployment method of claim 9, further comprising transmitting the applications to the portable communication device through a cellular communications network, the portable communication device downloading the applications to the converged infrastructure using at least one of a WiFi connection, a near field communication (NFC) connection, and a universal serial bus (USB) link.

13. The application deployment method of claim 9, further comprising obtaining the applications from a database.

14. The application deployment method of claim 13, further comprising accessing one version from among multiple versions of the applications stored in the database comprising a version control system.

15. A portable communication device comprising: at least one memory unit for storing a user application; and at least one processor that executes the user application to: when the converged infrastructure is at a deployment site, read customized application configuration information from a portable memory structure that has been physically coupled to a converged infrastructure prior to deployment, the converged infrastructure comprising a plurality of independently functioning computing devices, the customized application configuration information comprising an indication of at least two different applications to be deployed in the converged infrastructure on each of the computing devices, the portable communication device separate and distinct from the plurality of independently functioning computing devices; transmit the customized application configuration information to an application deployment server; when establish a communication link between the converged infrastructure and a server having the at least two different applications to be installed in the converged infrastructure according to the received customized application configuration information, the communication link including the portable communication device; and obtain, for each computing device in the plurality of independently functioning computing devices in the converged infrastructure, the at least two different application as indicated in the application configuration information for that at least two of the independently functioning computing devices from the server using the communication link including the portable communication device to the converged infrastructure for customizing the at least two independently functioning computing devices by installing the applications on the at least two independently functioning computing devices.

16. The portable communication device of claim 15, wherein the user application comprises a mobile app.

17. The portable communication device of claim 15, wherein the portable memory structure comprises at least one of a quick response (QR) code or a universal serial bus (USB) memory device.

18. The portable communication device of claim 15, wherein the user application is further executed to: receive an application package from the server, the application package comprising one or more configuration parameters associated with how the applications are configured in the converged infrastructure and customized application configuration information associated with how the converged infrastructure is configured; and download the application package to the converged infrastructure.

19. The portable communication device of claim 15, wherein the mobile app is further executed to transmit the customized application configuration information to the server through a cellular communications network, the portable communication device downloading the applications to the converged infrastructure using at least one of a WiFi connection, a near field communication (NFC) connection, and a universal serial bus (USB) link.

20. The application deployment system of claim 15, wherein the customized application configuration information is stored on the portable memory structure in an extensible markup language (XML) format.

\* \* \* \* \*